United States Patent
Hollreiser et al.

(10) Patent No.: US 8,218,601 B2
(45) Date of Patent: Jul. 10, 2012

(54) RECEIVER AND TRANSMITTER FOR USE IN A SATELLITE NAVIGATION SYSTEM

(75) Inventors: Martin Hollreiser, Noordwijk (NL); Roland Weigand, Noordwijk (NL)

(73) Assignee: European Space Agency, Paris (FR)

( * ) Notice: Subject to any disclaimer, the term of this patent is extended or adjusted under 35 U.S.C. 154(b) by 607 days.

(21) Appl. No.: 12/282,980

(22) PCT Filed: Mar. 9, 2006

(86) PCT No.: PCT/EP2006/002497
§ 371 (c)(1),
(2), (4) Date: Feb. 2, 2009

(87) PCT Pub. No.: WO2007/101454
PCT Pub. Date: Sep. 13, 2007

(65) Prior Publication Data
US 2009/0147835 A1    Jun. 11, 2009

(51) Int. Cl.
*H04B 1/00* (2006.01)
(52) U.S. Cl. ...................................................... 375/142
(58) Field of Classification Search .................. 375/142, 375/150; 342/352, 357.21; 370/316; 455/3.02, 455/427, 12.1; 701/13
See application file for complete search history.

(56) References Cited

U.S. PATENT DOCUMENTS

| | | | |
|---|---|---|---|
| 4,642,647 A | 2/1987 | Sturza | |
| 4,876,659 A | 10/1989 | Devereux | |
| 2005/0168382 A1* | 8/2005 | Awata | 342/357.02 |
| 2008/0304601 A1* | 12/2008 | Abraham et al. | 375/340 |

FOREIGN PATENT DOCUMENTS

| | | |
|---|---|---|
| JP | 2003152683 | 5/2003 |
| WO | 2005040845 A1 | 5/2005 |

OTHER PUBLICATIONS

Koch, Andreas, Structured Design Implementation-A Strategy for Implementing Regular Datapaths on FPGAs, XP-002956422, FPGA '96, Monterey CA USA, 1996 ACM 0-89791-771-1/96/02, pp. 151-157.

Gunawardena, Sanjeev et al. On Implementing GPS Block Processing Techniques in Fixed-Point Programmable Hardware, XP-002406122, ION GPS 2001, Sep. 11-14, 2001, Salt Lake City, Ut, pp. 778-788.

Textbook; Fundamentals of Digital Logic and Microcomputer Design, Combinational Logic Design, pp. 121-127.

* cited by examiner

*Primary Examiner* — Don N Vo
(74) *Attorney, Agent, or Firm* — Park, Vaughan, Fleming & Dowler LLP

(57) ABSTRACT

A receiver is provided for use with a satellite navigation system comprising a constellation of multiple satellites. Each satellite transmits a signal incorporating a spreading code. The receiver includes at least one code storage unit that includes combinatorial logic for storing a memory code comprising a fixed pattern of bits including address decoding, wherein the stored memory code corresponds to a spreading code incorporated into a signal transmitted from a satellite. The receiver further includes a correlator for performing a correlation between an incoming signal and the stored spreading code from the one code storage unit.

30 Claims, 6 Drawing Sheets

RECEIVER AND TRANSMITTER FOR USE IN A SATELLITE NAVIGATION SYSTEM

FIELD OF THE INVENTION

The present invention relates to a satellite navigation or positioning system comprising a constellation of multiple satellites, and especially to a receiver for use in conjunction with such a satellite navigation system.

BACKGROUND OF THE INVENTION

Satellite navigation systems are becoming increasingly important in a wide range of applications, including handheld devices for position determination, in-car navigation support, and so on. The main satellite navigation system in service at present is the global positioning system (GPS) operated by the United States Department of Defense. Worldwide sales of GPS equipment reached nearly 3.5 billion dollars in 2003, and this figure is expected to grow steadily over the next few years. A European counterpart satellite navigation system, named Galileo, is planned for launch and service availability later this decade.

A satellite navigation system comprises a constellation of satellites, each of which broadcasts one or more signals to earth. The basic components of a satellite signal are a spreading code (also referred to as a positioning, synchronisation or ranging code) which is combined with navigation data. The resulting combination is then modulated onto a carrier at a set frequency for transmission to earth. Each satellite generally transmits at multiple frequencies, which can help to compensate for ionospheric effects, to improve accuracy and to broadcast more data.

In some cases, multiple channels may be modulated onto a single carrier via some appropriate multiplexing scheme. For example, it is planned for certain Galileo signals to comprise a data channel combined with a pilot channel. The pilot channel contains only a spreading code, but no navigation data, while the data channel contains both the spreading code and the navigation data.

The spreading code component of a satellite signal typically comprises a predetermined sequence of bits (referred to as 'chips') and is used to perform two main tasks. Firstly, the spreading code provides a synchronisation and access (CDMA) mechanism to allow a receiver to lock onto a satellite signal. Thus each satellite (and typically each signal broadcast from that satellite) has its own synchronisation code. When a receiver is first switched on, it does not know which satellite signals can be received, since certain satellites in the constellation will be below the horizon for that particular location at that particular time. The receiver uses the synchronisation codes to lock onto a signal from a first satellite. Once this has been done, the navigation data in the signal can be accessed. This then provides almanac data for the other satellites in the constellation, and allows the remaining satellites that are visible to the receiver to be acquired relatively quickly.

Many receivers employ a two-phase acquisition process. In the first phase, the receiver performs a simultaneous correlation of the incoming signal against the set of satellite spreading codes. In particular, the receiver searches for a spreading code from any satellite, allowing for any possible timing offset between the satellite and the receiver, and for any possible Doppler shift between the satellite and the receiver (which is dependent on the motion of the satellite in space relative to the user). If a correlation value is found to exceed a predetermined threshold, then a second phase involving a more detailed analysis is performed for the relevant combination of satellite spreading code, timing offset and Doppler shift. This second-phase analysis verifies and confirms or if necessary rejects the initial coarse acquisition.

The second main task of a spreading code is to provide a distance estimate from the satellite to the receiver, based on the time that it has taken the signal to travel from the satellite to the receiver. The position of the receiver is then determined in three-dimensional space by using a process of trilateration, given the known positions of the satellites (as specified in the navigation data received from the satellites). In theory, trilateration can be performed with signal information from a minimum of three satellites, assuming that the timing offset between the receiver clock and satellite clocks is known. In practice, this timing offset is generally unknown, except for specialised receivers, so that signal information is obtained from at least one additional satellite to compensate for the unknown time offset at the receiver. If signals from further satellites are available, a statistical position determination can be performed using any appropriate algorithm such as least squares. This can also provide some indication of the error associated with an estimated position.

One important parameter for a spreading code is the chip rate at which the spreading code is transmitted, since this in turn controls the accuracy with which the positional determination can be made. Another important parameter for a spreading code is its total length, in other words the number of chips in the spreading code before it repeats. One reason for this is that the finite length of a spreading code can lead to ambiguity in the position determination. A longer length for the spreading code reduces such ambiguity, and also provides better separation of signals from different sources and increased robustness against interference. On the other hand, having a longer repetition length for the spreading code may delay initial acquisition of the signal, as well as requiring more processing capability within the receiver. In general, the length of the spreading code also impacts the data rate that can be used for the navigation data, since there is normally only one bit of navigation data for each complete spreading code sequence. Therefore, the longer the repetition length for the spreading code, the lower the bit rate for the navigation data.

One known strategy is to use a hierarchical or tiered spreading code based on primary and secondary codes. If we assume that a primary code has N1 chips and a secondary code has N2 chips, then the first N1 chips of the overall spreading code correspond to the primary sequence exclusive-ORed with the first chip of the secondary code, the next N1 chips of the spreading code comprise a repeat of the N1 chips of the primary code, this time exclusive-ORed with the second chip of the secondary code, and so on. This gives a total repetition length for the code of N1×N2, however the initial acquisition can be based on the primary code only.

The GPS spreading codes are implemented using linear feedback shift registers (LFSRs), in which selected outputs from an N-stage shift register are tapped and fed back to the input. The feedback connections within the LFSR can be represented as a binary polynomial in modulo-2 arithmetic of order N, whereby the operation of an LFSR is fully specified by its polynomial and the initial setting of the LFSR.

The GPS spreading codes are Gold codes, which have certain special mathematical properties. One of these is that they generate an output of pseudo-random noise (PRN) having a repetition length of $2^N-1$, so that a relatively compact LFSR can generate an output with a long repetition length. Gold codes also have good auto-correlation properties that support code acquisition and accurate positioning. In particular, the autocorrelation function has a well-defined peak at zero time shift, and is relatively small for all other (i.e. non-zero) time shifts. At the same time it is also important to select a set of Gold codes that has good cross-correlation properties, whereby the cross-correlation function between different codes is relatively small. This is important for signal acquisition, since it helps to prevent a synchronisation code from one satellite being accidentally mistaken for a synchronisation code from another satellite. A further important practical criterion for a spreading code is to have equal (or nearly equal) numbers of ones and zeros—this is referred to as balancing.

Additional information about satellite navigation systems can be found in: "Global Positioning System: Signals, Measurements and Performance", by Misra and Enge, Ganga-Jamuna Press, 2001, ISBN 0-9709544-0-9; "Global Positioning System: Theory and Applications", Vol 1 and Vol 2, by Bradford W. Parkinson and James J. Spilker Jr, ISBN 1-56347-106-X, published by the American Institute for Aeronautics and Astronautics; "Galileo User Segment Overview" by Hollreiser et al, ION GPS/GNSS 2003, September 2003, Portland, Oreg., p1914-1928; and "Galileo Test User Segment—First Achievements and Application", by Hollreiser et al, GPS World, July 2005.

Although the use of Gold codes is well-established for existing satellite navigation systems, there are some limitations associated with such codes. For example, they are only available with certain code lengths ($2^N-1$, and not all values of N can be used for the LFSR polynomial). In general, the code length is determined by the ratio of the chip rate of the spreading code and the bit rate of the navigation data. If the code length is restricted to an available Gold code, then this implies a constraint on the chip rate and the bit rate, which might in turn impact other considerations, such as acquisition time and positioning accuracy. In some cases, the limitation on code length for Gold codes has been overcome by using truncated Gold codes, but this truncation has an adverse impact on the mathematical properties of the code set (in terms of the autocorrelation function, etc).

Accordingly, it has been proposed in PCT applications PCT/EP2004/014488 and PCT/EP2005/007235 to use custom-designed or bespoke bit sequences as satellite spreading codes. This allows the development of spreading codes of arbitrary length, and also permits the optimisation of various properties such as auto-correlation and cross-correlation independent from other constraints. Such a spreading code will be described herein as a "memory" code, since in general a receiver stores the entire chip pattern of the code. This is in contrast to generating the chip pattern algorithmically, as for a Gold code, which uses a LFSR to generate a code algorithmically in accordance with its polynomial, rather than storing the chip pattern of the whole code. Note that since memory codes are typically created from (pseudo) random number sequences, they are not normally amenable to data compression techniques.

The set of memory codes for a receiver can be stored within some form of ROM such as flash memory. These codes can then be loaded into the receiver chipset at boot time for use during detection of the spreading codes in the incoming satellite signals. If the complete memory codes are loaded into the receiver chipset itself, this may represent a very significant overhead in terms of storage locations on the receiver chipset. Alternatively, the codes might be loaded into a RAM (external to the receiver chipset), where they would represent only a comparatively small addition to the overall program and/or data storage requirements for general receiver operations. However, in this case a dedicated high-speed interface to feed the codes in real-time from the RAM onto the receiver chipset is likely to be required, as well as some additional internal buffering within the receiver chipset itself.

Figure 1:
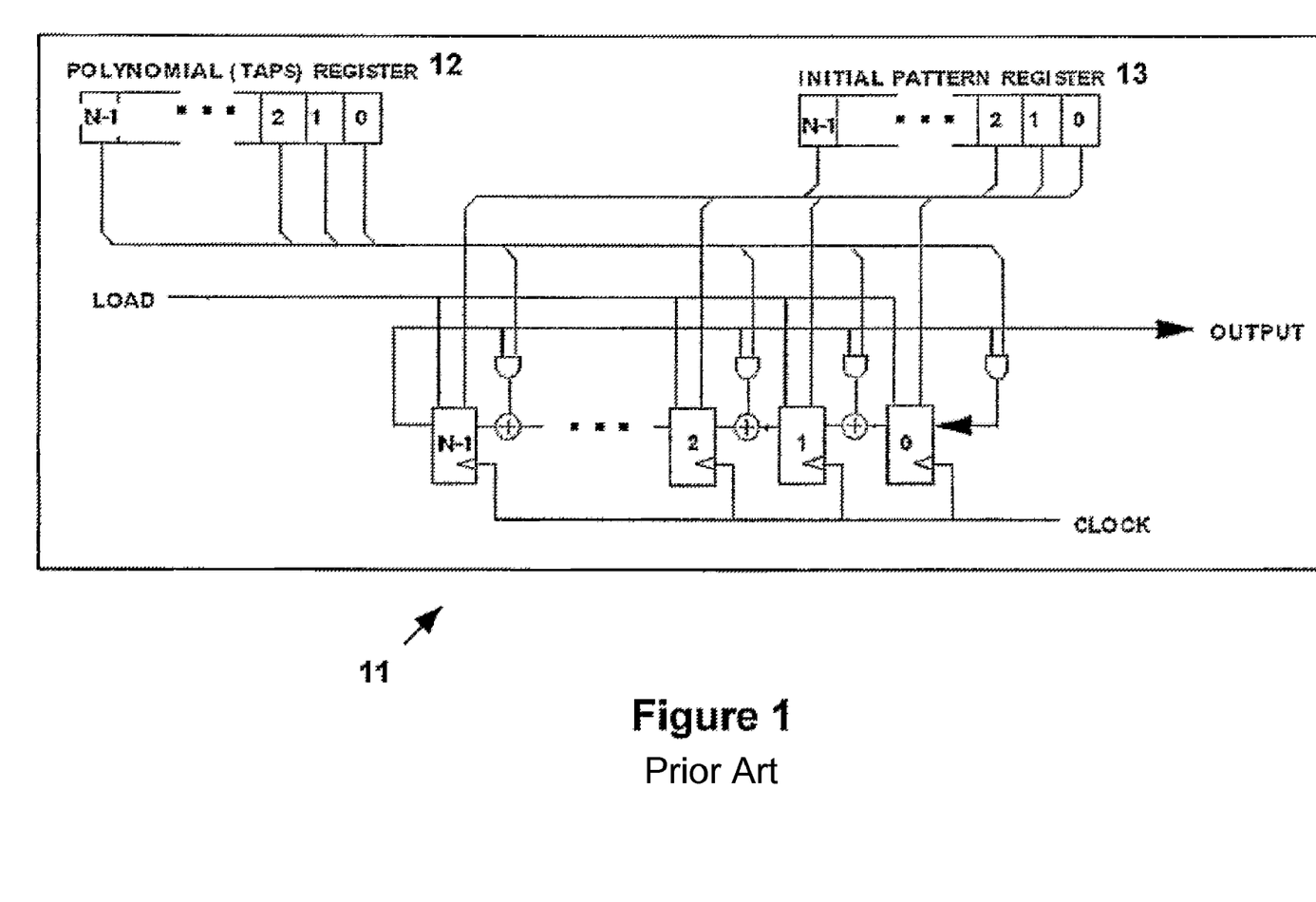
FIG. 1 is a schematic diagram of a conventional linear feedback shift register (LFSR) implementation.

FIG. 1 depicts a typical implementation of an LFSR, as might for example be provided within a conventional GPS receiver chipset. The basic hardware includes a shift register 11 of length N, plus two additional registers 12, 13, each also of length N. The design of the shift register itself is generic, in that the feedback taps are not hard-wired. Rather, feedback between the various stages of the shift register 11 is controlled by the polynomial value that is loaded into one of the two additional registers (the polynomial register 12). The initial setting of the LFSR is then determined by the value stored in the other additional register (the initial pattern register 13). In this way, the LFSR of FIG. 1 can be customised by providing appropriate values into the polynomial register and the initial pattern register.

The LFSR of FIG. 1 comprises 3N storage locations (since the shift register 11, the polynomial register 12, and the initial pattern register 13 each has N storage locations). As noted above, for a maximal Gold code the number of storage locations in the feedback shift register 11 is related to the length of the output code (L) by $N=^2 \log(L+1)$. Since a Gold code is generally based on combining the outputs from 2 LFSRs, the total number of storage locations T(S) for a Gold code can be expressed as: $T(S)=6*^2 \log(L+1)$. In addition, a standard LFSR code generator has some combinatorial logic to provide the feedback taps (XORs), as well as a small state-machine/controller in combination with a counter (or comparator+register) for resetting, reloading and restarting at the end of the sequence.

In contrast, a straightforward implementation of a memory code in a receiver might involve providing a full-length memory for each code to be stored in the receiver, including the relevant address decoders. The memory can be static or dynamic, depending on the implementation technology chosen. Most wide spread technologies (ASIC, FPGAs) support static memories. In addition, a small state-machine or controller for address generation would typically be used to ensure reading of the correct memory cell. Assuming that the equivalent gate-count of a static memory cell is 1.5 NAND2 (NAND2 represents a two-input NAND gate and typically comprises 6 transistors), then for 0.18 μm technology this results in an area of 18.75 μm² per memory cell. Including 200 gates for the state-machine/controller, and assuming a 4096 chip code (corresponding to the Galileo L1 signal), this is equivalent to 6344 NAND2 gates, with an overall area of 79300 μm². Alternatively, for a 10230 chip code, as for the Galileo E5a signal, and based on the same assumptions as above, this is equivalent to 15545 NAND2 gates, with an overall area of 194312 μm² (neglecting any savings due to the regularity of the structure). This can represent a significant overhead for the receiver chipset.

Note also that for the memory code case, $T(S) \approx L$. In other words, the number of storage locations rises in direct proportion to the length of the code, rather than in proportion to the logarithm of the code, as for an LFSR implementation. It is clear therefore that as the length of the spreading code increases, the use of memory codes demands significantly more storage locations than a conventional LFSR approach. This problem is exacerbated, in that a receiver has to store not one spreading code, but rather the complete set of spreading codes for all satellites and for all signals of interest.

SUMMARY OF THE INVENTION

Accordingly, one embodiment of the invention provides a receiver for use with a satellite navigation system comprising a constellation of multiple satellites, in which each satellite transmits a signal incorporating a spreading code. The receiver includes at least one code storage unit that includes combinatorial logic for storing a memory code comprising a fixed pattern of chips. The stored memory code corresponds to a spreading code incorporated into a signal transmitted from a satellite. The combinatorial logic includes address decoding functionality for retrieving a specified portion of the stored memory code. The receiver further includes a correlator for performing a correlation between an incoming signal and the stored memory code from the code storage unit.

It will be appreciated that a conventional implementation of a memory cell, for example as a flip-flop or register, is based on sequential logic that maintains state dependent on the previous input, so that the data to be stored is loaded as input signals into the device. In contrast, a spreading code can be considered as stored into the combinatorial logic by virtue of the hard-wired configuration of the combinatorial logic.

It will also be appreciated that an LFSR used for generating a spreading code in an existing receiver comprises sequential rather than combinatorial logic, since its output depends on the internal state in the registers. In addition, LFSRs are limited in the codes that they can generate to those codes defined by certain mathematical algorithms. In fact, an LFSR is better regarded as storing a mathematical algorithm (which can then be used to generate a code), rather than as storing a code per se. In contrast, the combinatorial logic can be used to store a generic or arbitrary spreading code, e.g. one without any predetermined mathematical properties, and one that is not generated using a predefined mathematical algorithm. The combinatorial logic can therefore be used to store a bespoke or customised memory code that has been optimised for a particular satellite navigation system. (Note that the combinatorial logic is not limited to such a customised memory code; it can also be used to store a memory code that corresponds to a Gold code or some other mathematical sequence).

In general, the receiver stores a different spreading code for each signal from each satellite in the satellite navigation constellation (for the services supported by the receiver). This may include spreading codes for replacement satellites to be used as spares, should any satellites in the constellation fail. There are various ways in which the set of spreading codes can be allocated to the code storage unit(s). For example, in one implementation, a single code storage unit may be used to hold the complete set of spreading codes for all the satellites in the constellation. In another embodiment, the spreading code for each signal from each satellite may be stored in a separate code storage unit. The skilled person will be aware of many other possible intermediate implementations for allocating the memory codes to the code storage units.

In one embodiment, the receiver includes multiple receive channels, and a stored memory code for a satellite from the code storage unit(s) may be supplied to any of the receive channels for correlation with the incoming signal on that receive channel. Thus although the memory codes themselves are hard-wired via the combinatorial logic, the allocation of the spreading codes to the different receive channels can be flexible. This flexibility is useful as for any given time or place on earth, only a subset of the navigation satellites are visible (others may be obscured by buildings or below the horizon). Accordingly, the ability to flexibly allocate the spreading codes from the code storage unit(s) to the various receive channels allows the number of receive channels in a receiver to be less than the total number of satellites, since in operation, the system allocates to the receive channels the spreading codes for those satellites that are currently visible. Furthermore this flexibility is useful should a satellite in the constellation fail, and its place taken by one of the spare satellites (assuming that the spreading code for this spare satellite is already stored in the receiver).

Note that for existing receivers, the number of receive channels for receiving a given class of signal is also usually less than the number of satellites in the constellation. This is achieved by appropriately configuring each LFSR within a receive channel for a desired satellite signal (using the polynomial and initial setting registers shown in FIG. 1). The combinatorial logic of the code storage unit(s) cannot be flexibly configured in this manner during operation, but some flexibility can nevertheless be regained at the receiver architecture level.

In one embodiment, the code storage unit is addressable to specify a particular segment of one or more chips of the stored memory code for output. The ability to provide a selectable portion of the memory code allows the memory code to be output over a limited number of output pins, and also better matches retrieval patterns for a memory code for normal usage. The code storage unit may include a sequencer to allow the device to step sequentially one or more chips at a time through the code produced by the combinatorial logic and/or an address facility to allow a particular portion of the memory code to be selected for output Note that such an output mechanism may be implemented in sequential logic (such as to step through the code), but this sequential output of the code can be regarded as logically distinct from the code storage by the combinatorial logic (even if the code storage and output are then integrated at the physical component level of the code storage unit).

The output from the code storage unit may comprise a single chip at a time, or each output may comprise a set of multiple chips. Note that this latter option reflects a further difference between storing a spreading code in combinatorial logic compared with using an LFSR, in that an LFSR outputs only a single chip at a time. In contrast, since a combinatorial logic block stores the entire chip pattern of the code, multiple code chips can therefore be available for simultaneous output at any given time (if so desired).

The code storage unit is especially suited to implementation as a field programmable gate array device (FPGA) or as an application specific integrated circuit (ASIC—gate array, standard cell), although any appropriate semiconductor technology may be used (e.g. full customization, etc). The use of combinatorial logic is generally compatible with the available circuitry on FPGAs and/or ASICs, and accordingly the combinatorial logic can be designed and implemented using standard semiconductor development tools. It will be appreciated that the use of standard technologies such as FPGAs and ASICs also assists with implementing the combinatorial logic as part of the main receiver chipset (thereby avoiding the need for a high speed interface between the code storage unit(s) on one device and a separate receiver chipset).

The code storage unit(s) can be used to store multiple levels of a hierarchical code. For example, a code storage unit may be used to store a primary code and/or a secondary code. Note that if the code storage unit(s) hold(s) both a primary code and a corresponding secondary code, then these can be stored either as one long sequence (representing the final combined code for output), or as separate primary and secondary codes. It will be appreciated that the latter configuration is more compact, since only $N1+N2$ chips need to be stored, compared to $N1 \times N2$ for storage of the complete (combined) code sequence. In other embodiments, the combinatorial logic may only be used to store one level of a hierarchical code, for example the primary codes.

Another embodiment of the invention provides a satellite for use in a satellite navigation system comprising a constellation of multiple satellites, in which each satellite transmits a signal incorporating a spreading code. The satellite includes at least one code storage unit that includes combinatorial logic for storing a memory code comprising a fixed pattern of chips. The memory code corresponds to a spreading code to be incorporated into a signal transmitted from the satellite. Thus the approach used for generating a spreading code in a receiver for correlation with an incoming signal can also be used for generating a spreading code for broadcast from a satellite.

Another embodiment of the invention provides a method for operating a receiver for use with a satellite navigation system comprising a constellation of multiple satellites. Each satellite transmits a signal incorporating a spreading code. The method includes providing at least one code storage unit that includes combinatorial logic for storing a memory code comprising a fixed pattern of chips. The memory code corresponds to a spreading code incorporated into a signal transmitted from a satellite. The method further includes performing a correlation between an incoming signal and the spreading code stored in the combinatorial logic.

Another embodiment of the invention provides a method of producing a receiver for use with a satellite navigation system comprising a constellation of multiple satellites, in which each satellite transmits a signal incorporating a spreading code. The method includes determining a satellite spreading code to be stored within the receiver, and providing at least one code storage unit including combinatorial logic for storing a fixed pattern of chips corresponding to the satellite spreading code.

In one embodiment, the combinatorial logic is generated by producing a specification of the fixed pattern of chips within a hardware description language. This specification can then be implemented on a desired platform using logic synthesis. Note that the specification of the combinatorial logic in the hardware description language can use a constant to define a desired output code. Accordingly, the only change needed to define a different spreading code is to update the value of the constant.

BRIEF DESCRIPTION OF THE DRAWINGS

Various embodiments of the invention will now be described in detail by way of example only with reference to the following drawings.

DETAILED DESCRIPTION

Figure 2:
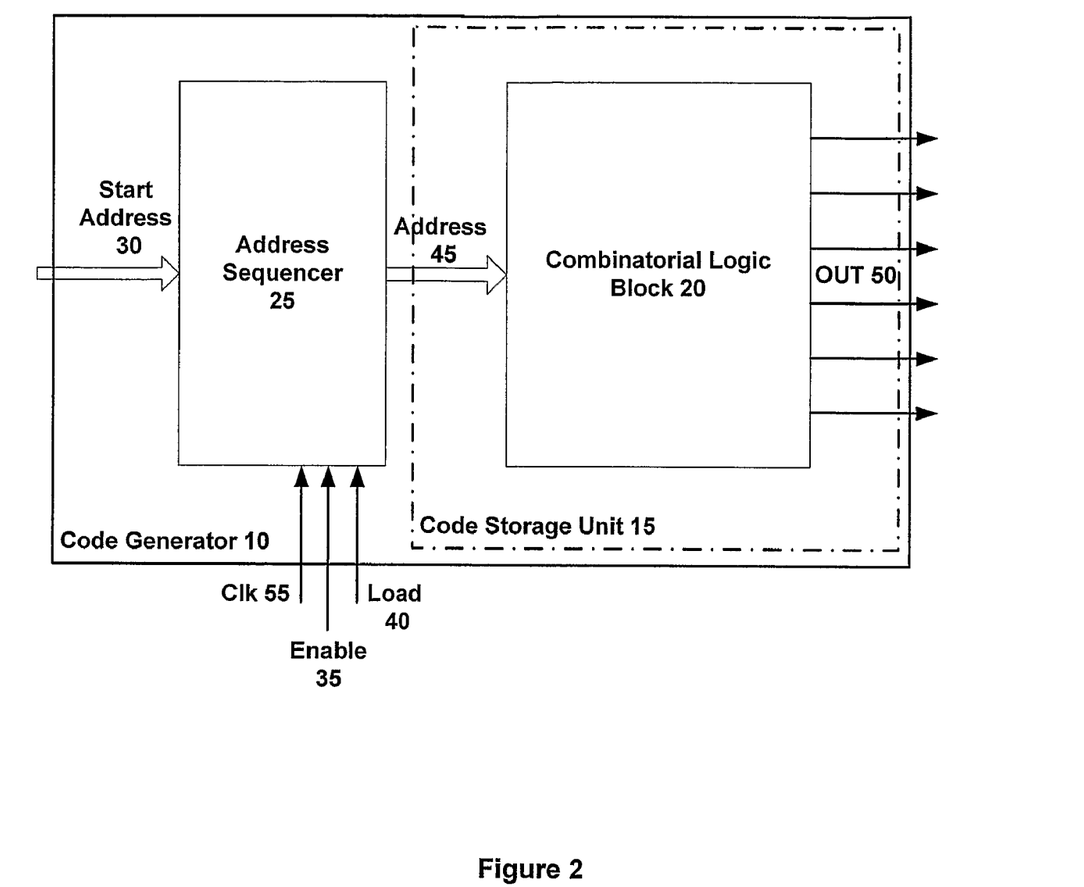
FIG. 2 is a schematic diagram showing the storage of a memory code using combinatorial logic in accordance with one embodiment of the invention.

FIG. 2 is a schematic illustration of a code generator 10 including a code storage unit 15 in accordance with one embodiment of the invention. Code generator 10 is used to store and output one or more memory codes, and therefore takes the place of a unit such as the LFSR of FIG. 1 in a conventional receiver.

Code generator 10 can be considered logically as comprising two main components, a code storage unit 15 and a sequencer 25. The code storage unit 15 comprises combinatorial logic 20, which is used to store the memory code and to provide address decoding. The sequencer 25 is used to specify the address of the desired portion of the memory code for output, by loading appropriate start addresses and incrementing current addresses. (Note that in a physical implementation, the functionality of these two components is likely to be integrated, as explained in more detail below, so that there is no clear division between the combinatorial logic and the sequencer; nevertheless, but from a logical or functional perspective, the two components can be considered separately).

In the example of FIG. 2, combinatorial logic 20 has a number of outputs Out 50. For a defined address 45, the outputs 50 are defined, depending upon the particular configuration of gates within combinatorial logic 20. While activating load 40, a start address 30 is loaded into address sequencer 25. The address from the address sequencer 25 is then supplied as address 45 to the code storage unit 15 and the corresponding fraction of the memory code appears at the outputs 50 of the combinatorial logic 20.

The address sequencer increments address 45 with every pulse on clk 55 when the enable input 35 is asserted. This causes the corresponding fractions or portions of the memory code to appear at the outputs 50 of the combinatorial logic 20. Otherwise, when the enable signal is not asserted, the specified address 45 and hence the outputs of the combinatorial logic 20 remain constant.

It will be appreciated that since logic block 20 is combinatorial rather than sequential, it does not store any state information. Hence combinatorial logic is not normally considered as a form of memory device. Nevertheless, the configuration of gates within the combinatorial logic 20 can be viewed as a form of (hard-wired) storage, such that the outputs 50 from the combinatorial logic 20 correspond to a stored set of bits. The combinatorial logic can therefore be considered as a form of read only memory (ROM), storing a set of bits for each address 45. Note however that the "contents" of the combinatorial logic are fixed (assuming that the combinatorial logic block is hard-wired) and so cannot be updated, in contrast to many standard forms of "ROM", such as flash memory, EEPROM, which do support some form of write mechanism. In addition, the internal configuration of the combinatorial logic 20 is particular (customised) to the stored set of bits, unlike a Random Access Memory (RAM), which is normally formed of standardised memory cells that are then loaded with data values. In other words, in most conventional memory devices, there is a logical separation between the general hardware structure of the memory device, and the data contents that are being stored into the device (an analogous separation is also true of the LFSR architecture of FIG. 1). With combinatorial logic 20 however, there is no such logical separation, in that the hardware structure corresponds directly to (i.e. reflects or represents) the actual data contents that are being stored (plus address decoding).

The outputs 50 from combinatorial logic 20 can be arranged to represent any given set of bits by choosing an appropriate configuration of gates within the combinatorial logic (as described in more detail below). Consequently, the combinatorial logic of FIG. 2 can be used to store a chip sequence corresponding to a memory code, such that the outputs 50 from the logic block correspond to the chip sequence of the memory code. (It will be appreciated that this involves defining a suitable ordering for the outputs 50 from combinatorial logic 20 to match the sequential nature of the memory code. This can be achieved through merging the address decoding with the actual memory code content during logic synthesis, as described in more detail below).

For a long memory code sequence L comprising a few thousand chips (for example), it is not normally convenient to output all the memory code chips in parallel, since this would involve a very large number of output pins. In addition, it is not generally required for receiver operations to output an entire spreading code at once. Rather, the combinatorial logic 20 outputs a subset of one or more chips from the memory code for each specified address 45.

For example, depending on the overall receiver architecture 1. a single chip can be provided per increment of address 45. This chip is then routed to a single receiver correlator. In this case only one memory code is contained in the combinatorial logic 20.
2. If more than one memory code (e.g. memory codes for more than one signal and/or more than one satellite) is contained in combinatorial logic 20, then this unit has to be time shared by several receiver correlators. In such an implementation, combinatorial logic 20 outputs a first sub-sequence of a first memory code when address 45 increments to a particular value. This sub-sequence is routed to a corresponding first receiver correlator. While the first receiver correlator is working through its sub-sequence, other sub-sequences of different memory codes are provided by combinatorial logic 20 to different receiver correlators. Once all the receiver correlators have been served, the sequencer returns to the first receiver correlator and provides the second sub-sequence of the first memory code to the first receiver correlator.

The length of the individual sub-sequences depends on the overall number of receiver correlators to be served by an individual code generator 10. Typical numbers of chips per sub-sequence might be N=8, 16, 32, 64, or 128. Thus for each successive activation of the clk 55 signal while the enable signal 35 is active, sequencer 25 increments address 45 and combinatorial logic 20 outputs the next N chips over outputs 50.

For example, assuming only one memory code is stored in combinatorial logic 20, if L=4096, and N=16, then the first clk 55 tick (while enable signal 35 is active) outputs chips 0-15 of the memory code stored in combinatorial logic 20, the next clk 55 tick outputs chips 16-31 of the memory code stored in combinatorial logic 20, and so on, until the entire memory code has been output (whereupon we cycle back to chip 0). In another embodiment, N=1, in which case the stored memory code is output chip-by-chip from code storage unit 15.

It will be appreciated that since sequencer 25 maintains state information (its position/address within the memory code sequence), sequencer 25 involves sequential logic rather than pure combinatorial logic. For example, if L=4096 and N=16, sequencer 25 may be implemented in one embodiment as an 8-bit counter.

In the embodiment of FIG. 2, sequencer 25 is also provided with an address mechanism in the form of address control signal 30. This address control signal 30 can be used to specify a particular location within the memory code sequence for output. Thus if we continue with the above example, where L=4096 and N=16, and sequencer 25 is an 8-bit counter, then address control signal 30 may be provided as an 8-bit value to load into the counter. In other words, while enable signal 35 increments sequencer 25 to the next code location, address control signal 30 can be used to set sequencer 25 to any desired (new) location within the code. In another embodiment, address control signal 30 is replaced by a simple reset line that returns the counter value within sequencer 25 to zero. This embodiment allows the sequencer location within the code to be reset, but does not allow an arbitrary location within the memory sequence to be specified to the sequencer.

For a receiver that stores multiple memory codes, such as different memory codes for different satellites, there are various configurations possible for storing the different codes. In one implementation, a separate code storage unit is provided for each different memory code. Alternatively, a single large code storage unit could be used to store all the memory codes, with addressing mechanism 30 then being used to select both a code and a code position to output. A further possibility is that there are multiple code storage units, with each unit storing memory codes for some but not all of the satellites or for some but not all of the signals—for example six code storage units each storing memory codes of five satellites or each code storage unit storing all memory codes for one satellite, etc. A further possibility is that a single memory code is split or striped across multiple code storage units.

The use of combinatorial logic 20 to store memory codes including address decoding exploits the fact that once the codes have been defined and consolidated, they can generally be considered as fixed—hence they do not need to be stored in conventional (updateable) memories. The use of combinatorial logic to store or represent the memory codes can result in a considerable reduction in complexity in terms of gates and semiconductor area, albeit at the loss of some flexibility. Nevertheless, some of this flexibility can be regained at the architecture level, as described in more detail below.

Figure 3:
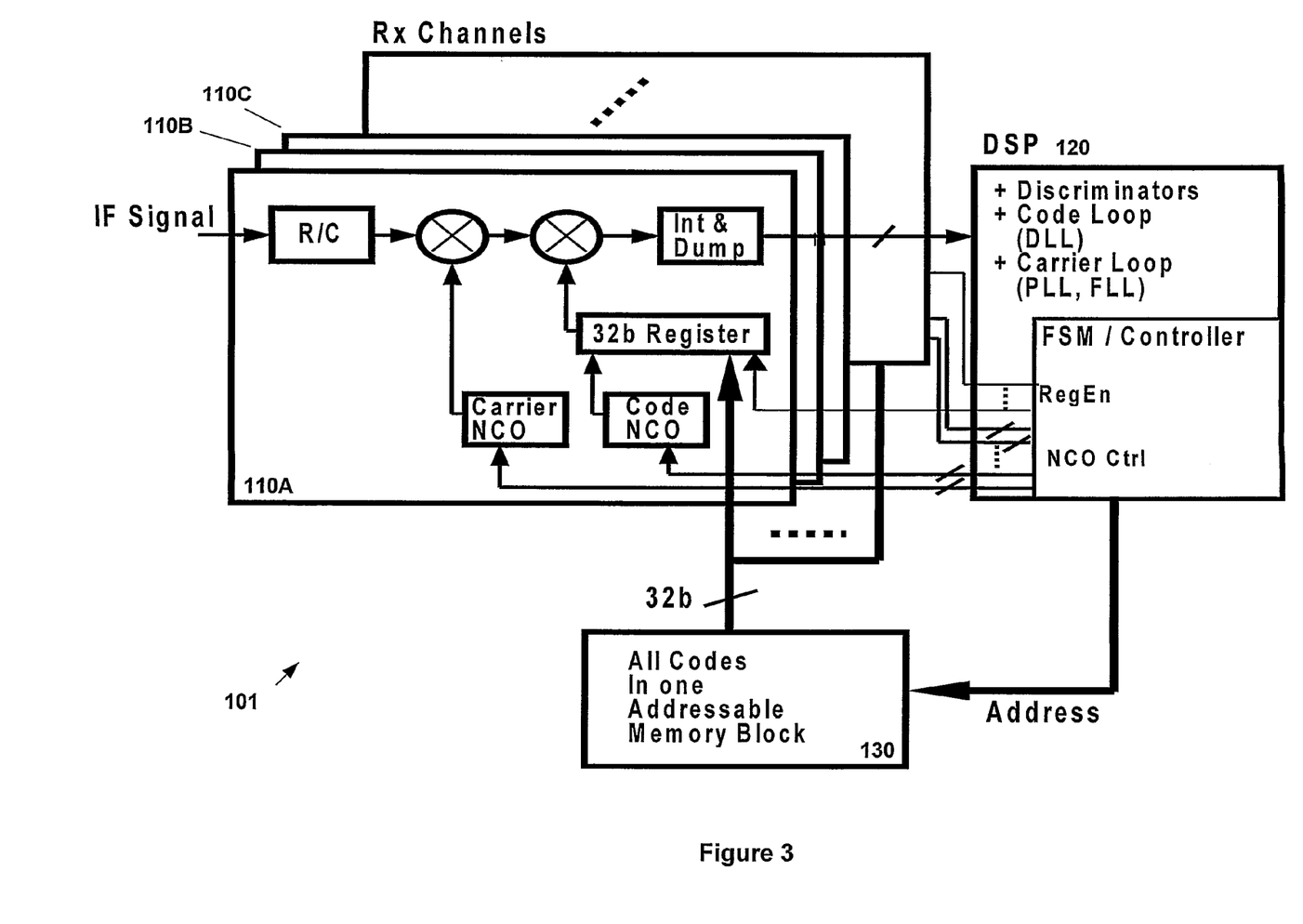
FIG. 3 is a schematic diagram showing the architecture of a receiver in accordance with one embodiment of the invention in which all memory codes are stored in a single code storage unit.

FIG. 3 is a schematic diagram of a receiver 101 in accordance with one embodiment of the invention. In particular, FIG. 3 illustrates the base-band portion of a receiver used to acquire and track a signal, while other standard portions (e.g. aerial, RF Front-end, navigation unit, etc) are omitted for clarity. Receiver 101 may be provided as a stand-alone unit, or may be incorporated into some larger device, for example a mobile (cellular) telephone, a computer, an automobile or other form of vehicle, a hospital bed, an aircraft or ship, a freight container, and so on.

The receiver 101 includes a code storage unit 130, as well as a digital signal processor (DSP) 120 and multiple receive (Rx) channels 110A, 110B, 110C, etc. It will be appreciated that the different receive channels all process the same incoming signal, but that the processing applied to the incoming signal varies from one receive channel to another, as described in more detail below. The code storage unit 130 is used to store the set of memory codes for the constellation of satellites. In one embodiment, code storage unit 130, DSP 120, and receive channels 110 are implemented as a single semiconductor device or chipset, although other embodiments may split these components across multiple devices.

It will be appreciated that the number of codes within a given code set (and hence to be stored within logic block 130) is dependent upon the particular requirements of the relevant satellite navigation system. Such systems are generally designed to operate with some 24-30 different satellites, usually with one or more additional satellites provided as potential spares in case of failure. There are also normally multiple signals per satellite. In addition, some Galileo signals comprise a pilot and a data component (which can be handled within a single receive channel).

It is assumed that the architecture of FIG. 3 is designed to receive a single signal per channel. A channel can be flexibly assigned to any carrier and signal component of any satellite coming from the RF Front-end. Code storage unit 130 stores the codes used on any carrier and signal across the satellite constellation.

In some embodiments, the number of codes within a code set may be increased to accommodate "pseudolite" signals, which are emitted from ground locations, for example near airports. Such pseudolite signals appear to a receiver as additional satellite navigation signals, and so can give a more precise and reliable position determination in such locations.

The general operation of a receive channel 110 is that the incoming real intermediate frequency signal is converted to a complex baseband signal. The baseband signal is then mixed with the output of a carrier numerically controlled oscillator (NCO) to remove Doppler effects from the signal. Next the incoming signal is correlated with a local spreading code—i.e. a code stored or generated within the receiver, the timing of which is controlled by the code NCO. The results of this correlation are integrated for a predetermined time, and then passed to the DSP 120. Here discriminators and loop filters close the respective carrier loop (frequency-locked loop (FLL), phase-locked loop (PLL)) and code loop (delay-locked loop (DLL)) with the relevant NCOs.

It will be appreciated that the operation of the receiver 101 as so far described generally matches the behaviour of existing satellite navigation receivers, such as used for GPS. Further details about such receivers can be found in the aforementioned book by Misra and Enge. (It will also be appreciated that for reasons of clarity, certain details regarding receiver 101 that are not directly pertinent to an understanding of the invention, such as the handling of the data and pilot codes, are omitted from FIG. 3).

In existing receivers, the local spreading code is generated by an LSFR, such as shown in FIG. 1, which can be incorporated into each receive channel 110A, 110B, etc. In contrast, the receiver of FIG. 3 uses a code storage unit 130 (such as shown in FIG. 2) to store the memory codes. The code storage unit 130 receives an address signal from the DSP 120 that determines which part of the stored codes to output to the respective receive channels 110. This output address is specified by a finite state machine (FSM)/controller included within the DSP 120.

In the embodiment of FIG. 3, it is assumed that each address corresponds to a 32-chip chunk of memory code within unit 130. This chunk of memory code is then loaded into a register within the appropriate receive channel 110 for use in the correlation with the incoming signal. The correlation of the 32-chip portion of the memory code stored in the register is carried out under the control of the code NCO in generally the same manner as for existing systems using LFSR codes. (An existing receiver can be regarded as similar to the embodiment of FIG. 3, but without code storage unit 130, and with a code LFSR rather than a buffer register within each receive channel). Note that other embodiments may use a different word length for reading out data from code storage unit 130, depending upon the overall number of receive channels and the bandwidth available at the output interface of code storage unit 130.

In general, the FSM/controller within DSP 120 controls code storage unit 130 to provide a 32-chip code segment to each receive channel 110 in turn. Thus once a 32-chip code segment has been supplied to receive channel 110A, the FSM/controller cycles through each of the other receive channels 110B, 110C, . . . 110N in turn to provide them with their own respective code segment. While code storage unit 130 is supplying code segments to the other receive channels, receive channel 110A correlates the 32-chip code segment buffered in its register with the incoming signal (this is usually performed one chip at a time). The FSM/controller then causes the code storage unit 130 to output the next 32-chip code segment of the appropriate memory code into the register of receive channel 110A, and the cycle continues. Thus the address signal supplied by the FSM/controller to the code storage unit 130 identifies in effect both a particular receive channel, and also a location within the specified memory code sequence for supply to that receive channel.

In most receivers, the number of receive channels 110 is less than the number of satellites in the constellation. This reflects the fact that only a limited proportion of the satellites are visible at any given time (the actual set of satellites above the horizon from any given location changes with time, as the satellites progress in their orbits).

As illustrated in FIG. 1, a typical LFSR implementation is generic, in that it can be loaded with the polynomial code for any desired satellite. This allows the LFSR to be incorporated into a receive channel without tying the receive channel to a given satellite code. Rather, for a satellite constellation using Gold codes, any given receive channel can be configured to receive the signal from any given satellite. This ensures that a limited set of receive channels can be mapped onto the subset of those satellites currently visible by the receiver.

In contrast, the spreading codes in code storage unit 130 are fixed or hard-wired into the combinatorial logic. Therefore, in order to maintain flexibility in allocating the receive channels to the various satellites, receiver 101 is able to supply a memory code stored in code storage unit 130 to any given receive channel 110 (as specified by DSP 120). This facility preserves the ability to make a flexible allocation of receive channels 110 to satellites.

Figure 4:
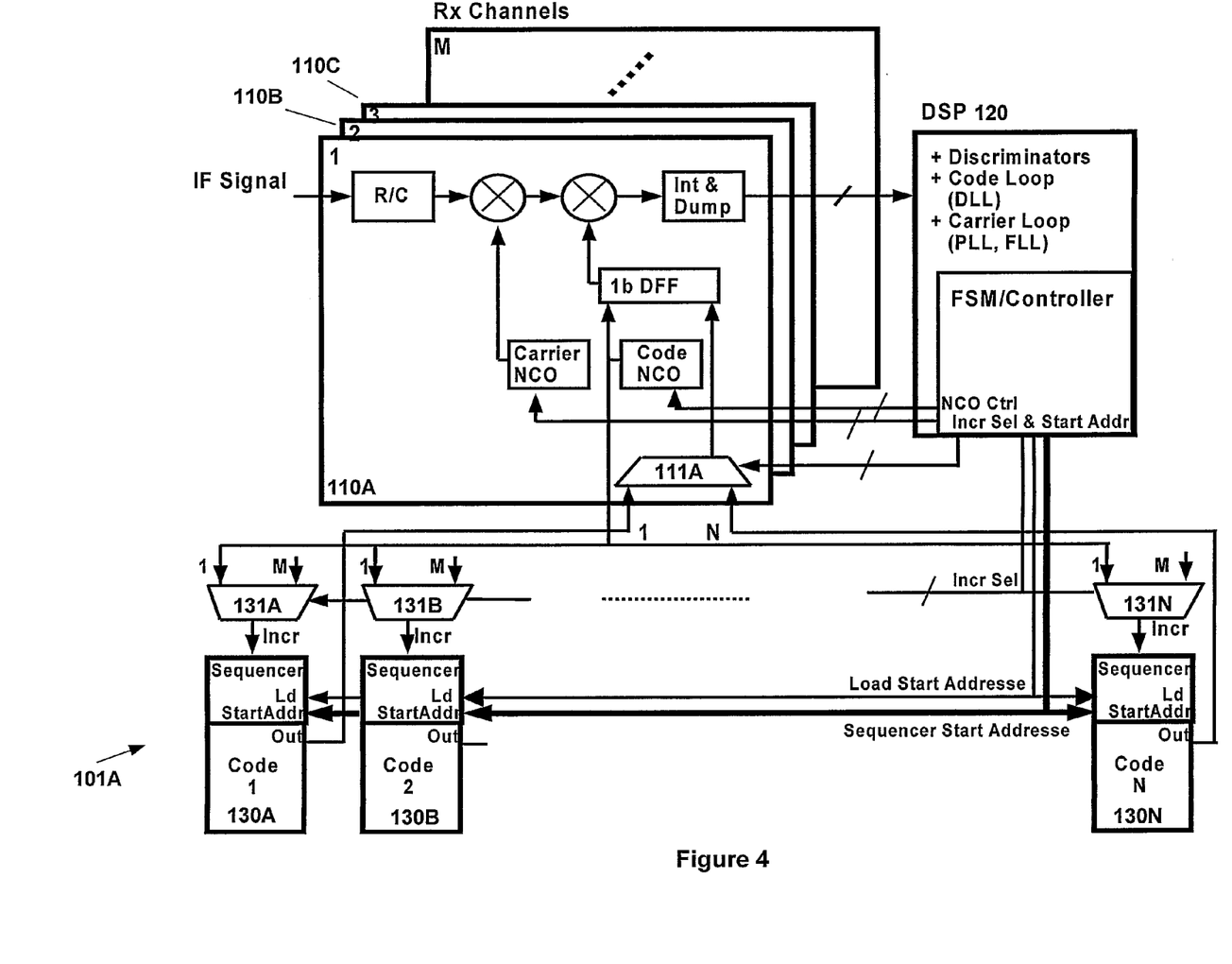
FIG. 4 is a schematic diagram showing the architecture of a receiver in accordance with another embodiment of the invention, in which each memory code is stored in a separate code storage unit.

FIG. 4 depicts a receiver implementation 101A in accordance with another embodiment of the invention. Note that many aspects of the embodiment of FIG. 4 are the same as for the embodiment of FIG. 3, so the following description focuses on the differences between the two embodiments.

The embodiment of FIG. 4 does not have a single code storage unit, but rather has a set of code storage units 130A, 130B, . . . 130N. Each code storage unit 130A, 130B, etc stores the spreading code for one signal from one satellite. Each receive channel 110 includes a multiplexer 111, which is connected to the output of each of the code storage units 130A, 130B, etc. (For simplicity, only the connections from the code storage units 130A, 130B, etc to receive channel 110A are shown in FIG. 4; analogous connections are provided from code storage units 130A, 130B, etc to the other receive channels 100B, 110C, and so on). The output from multiplexer 111 is then passed to a flip-flop within the receive channel 110, and from there, the code bit is loaded for correlation with the incoming signal as per existing receivers.

A control signal is supplied to the multiplexer 111 from a controller within DSP 120, and this control signal is used to select an output from the various inputs to the multiplexer. It will be appreciated that this configuration allows the DSP controller to select the memory code from any given code storage unit 130A, 1301B, etc to supply to any given receive channel 110A, 110B, etc. Thus although the memory codes can be considered as hard-wired into the various code storage units 130, they can be flexibly allocated to the set of receive channels (as for the embodiment of FIG. 3). In operation therefore, the DSP 120 controls multiplexers 111 using this control signal so that each receive channel 110 has in effect an assigned code storage unit 130.

The number of receive channels may be less than the number of satellites in the constellation. Hence, for this embodiment, the number of receive channels may also be less than the number of code storage units 130—i.e. M<N. The flexible assignment between receive channel 110 and code storage unit 130 therefore allows the DSP to allocate the receive channels 110 to those code storage units containing spreading codes for the satellites that are currently visible. Support for such flexible assignment is also useful if one or more satellites were to fail be replaced by satellites that use different memory codes (assuming that the replacement codes are also available within code storage units 130).

Each code storage unit 130A, 130B, etc includes a sequencer which can be set to a specified load address (as described above in relation to FIG. 2). The sequencer receives an increment (enable) signal to step one chip through the memory code for output to multiplexer 111. In the embodiment of FIG. 4, the increment signal to a code storage unit 130A, 130B, etc is received through a corresponding multiplexer 131A, 131B, etc. Each multiplexer 131A, 131B, etc receives an input from the code NCO on each of the receive channels 110A, 110B, etc. A similar control signal that is supplied to multiplexer 111 is also used to select an input to pass through the multiplexer 131 as an increment signal to code storage unit 130. Accordingly, the code NCO within a receive channel 110 is able to request (enable) the next code chip to be retrieved from the code storage unit 130 whose output is assigned to that receive channel.

In receiver 101A, the spreading code is accessed a single chip at a time (rather than 32 chips at a time, as in the embodiment of FIG. 3), since the various code storage units 130A, 130B, etc. can output to their respective receive channels 110A, 110B, etc in parallel with one another. Thus each receive channel can, in effect, receive a code chip on demand from its allocated code storage unit. (In contrast, the code storage unit 130 of FIG. 3 services the set of receive channels sequentially, in a time-shared manner, so each access provides a receive channel with sufficient chips until the next time that the receive channel is serviced). This configuration therefore allows independent control by the code NCO within each receive channel of the rate at which chips are supplied to the correlator.

It will be appreciated that the embodiments of FIG. 3, where all the memory codes are held within a single code storage unit, and FIG. 4, where each memory code is held in a separate code storage unit, represent just two possible implementations. For example, in other embodiments there may be multiple code storage units each storing multiple (but not all) memory codes, while in other embodiments, each memory code may be spread across multiple code storage units.

Figure 5:
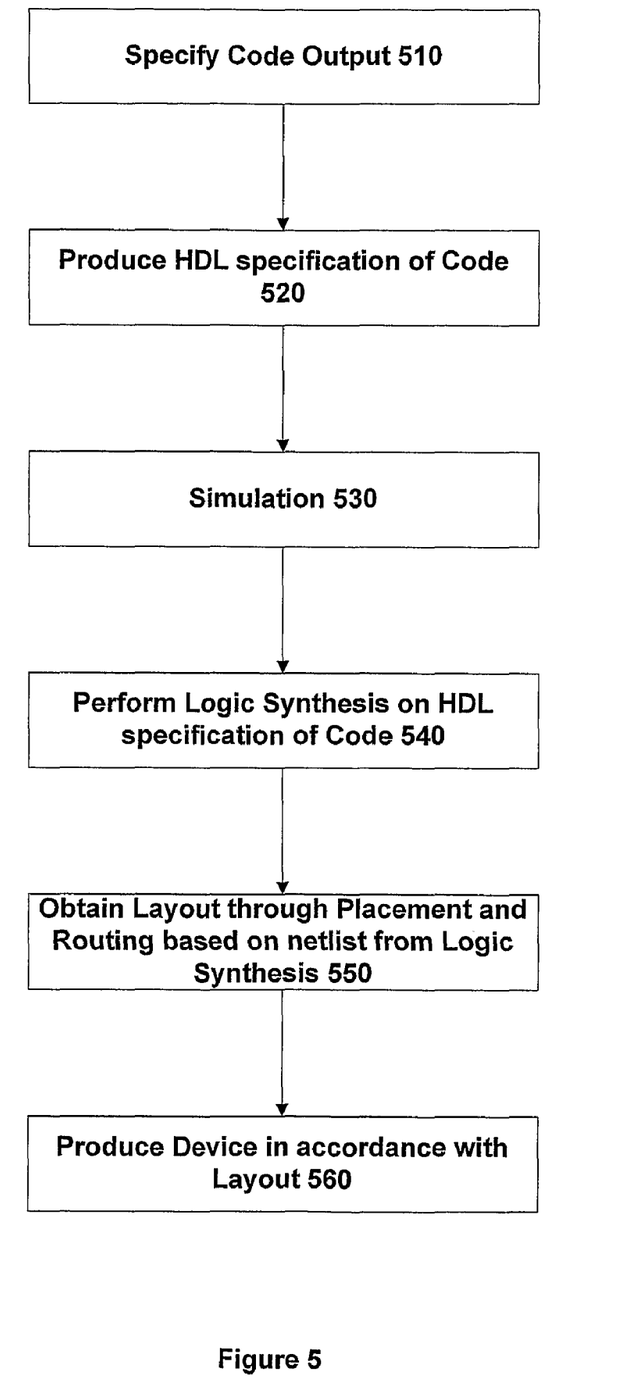
FIG. 5 is a flowchart illustrating a method for designing a code storage unit for storing memory codes in accordance with one embodiment of the invention.

FIG. 5 is a flowchart that provides a high-level overview of producing a code storage unit 130 in accordance with one embodiment of the invention. The method commences by specifying the desired spreading code (510). It will be appreciated that the method of FIG. 5 is generic, in that it can be used with an arbitrary (e.g. customised or bespoke) chip sequence for a spreading code. This is in contrast, for example, to LFSR implementations, which are only able to provide a restricted set of spreading codes—i.e. those codes that can be expressed via certain predetermined mathematical algorithms.

The code storage unit for the desired spreading code is described using a hardware description language (HDL) (520). An example of an HDL is VHDL, the Very High Speed Integrated Circuits Hardware Description Language, which is the subject of IEEE Standard 1076. Another example of an HDL is Verilog, which is the subject of IEEE Standard 1995. VHDL and Verilog are well-known to the person skilled in the art, and allow for the specification of function and structure for integrated circuits.

Once an HDL description of a circuit for generating the desired spreading code has been developed and compiled, a simulation can be performed (530) to confirm that the circuit behaves as expected. There are many commercially available tools for performing such a simulation. The HDL description can then be used as the input to a logic synthesis procedure (540), which transforms the HDL description into a structural netlist of components (library elements) for the circuit. This netlist is used as an input to appropriate placement and routing tools to obtain the layout for a semiconductor device (550). Depending on the technology selected, the ASIC or customised semiconductor device (560) can then be manufactured or a field programmable gate array (FPGA) can be configured. Again, it will be appreciated that there are standard commercial tools available for performing a logic synthesis on a circuit described using an HDL, and then transforming this into an actual implementation.

Appendix 1 provides an example VHDL program for implementing a code storage unit 130 in accordance with one embodiment of the invention. The code storage unit (referred to as "cacode") outputs the 64 chip sequence defined as the constant "ca". It will be appreciated that other code sequences may be implemented using the same VHDL code by suitably adjusting the value of constant "ca" to the desired chip pattern.

The VHDL for cacode specifies 5 inputs and one output to perform the following functions:

phase—this input specifies the initial address of the first output chip, and comprises 6 chips, corresponding to the address range of the 64 chip sequence for ca;
phset—this input enables the value of phase
clk—clock input;
tick—this input is used to indicate when another code output is required (to correlate against the incoming signal); note that tick has a much lower frequency than clk;
rstn—this input resets the address and the output to zero;
code—this output represents the value of cacode at the relevant address.

In operation, the specified circuit outputs successive values from the chip sequence for cacode for each tick value, where the variable addr is used to maintain the address or current position within the chip sequence. It will be appreciated that the address component of this circuit is sequential (rather than purely combinatorial), since the current output address is maintained and incremented for each code chip output. However, from a functional perspective, we can regard the circuit as having a first portion for storing the spreading code including address decoding, and a second portion for generating the address and thus controlling the spreading code output. From this perspective, the first portion for storing the spreading code and address decoding is combinatorial, while the second portion for generating the address and controlling of the spreading code output is sequential. It will be appreciated that this distinction between the combinatorial and sequential portions is clear at a functional level, but at the level of physical implementation the two portions are generally integrated (see below).

The skilled person will be aware of various other possible specifications for a code storage unit. For example, the embodiment of Appendix 1 might be modified so that phset is defined as always active, in which case the circuit will output the code chip defined by the address specified by phase. In such an embodiment, there is no state information within the circuit itself, but rather this information regarding position within the code sequence must be maintained externally, for example by the circuit component that provides the phase signal (and which can then increment the phase signal accordingly). In theory such an implementation would allow the code storage unit to be purely combinatorial, although in practice a sequential component is likely to be provided.

Figure 6:
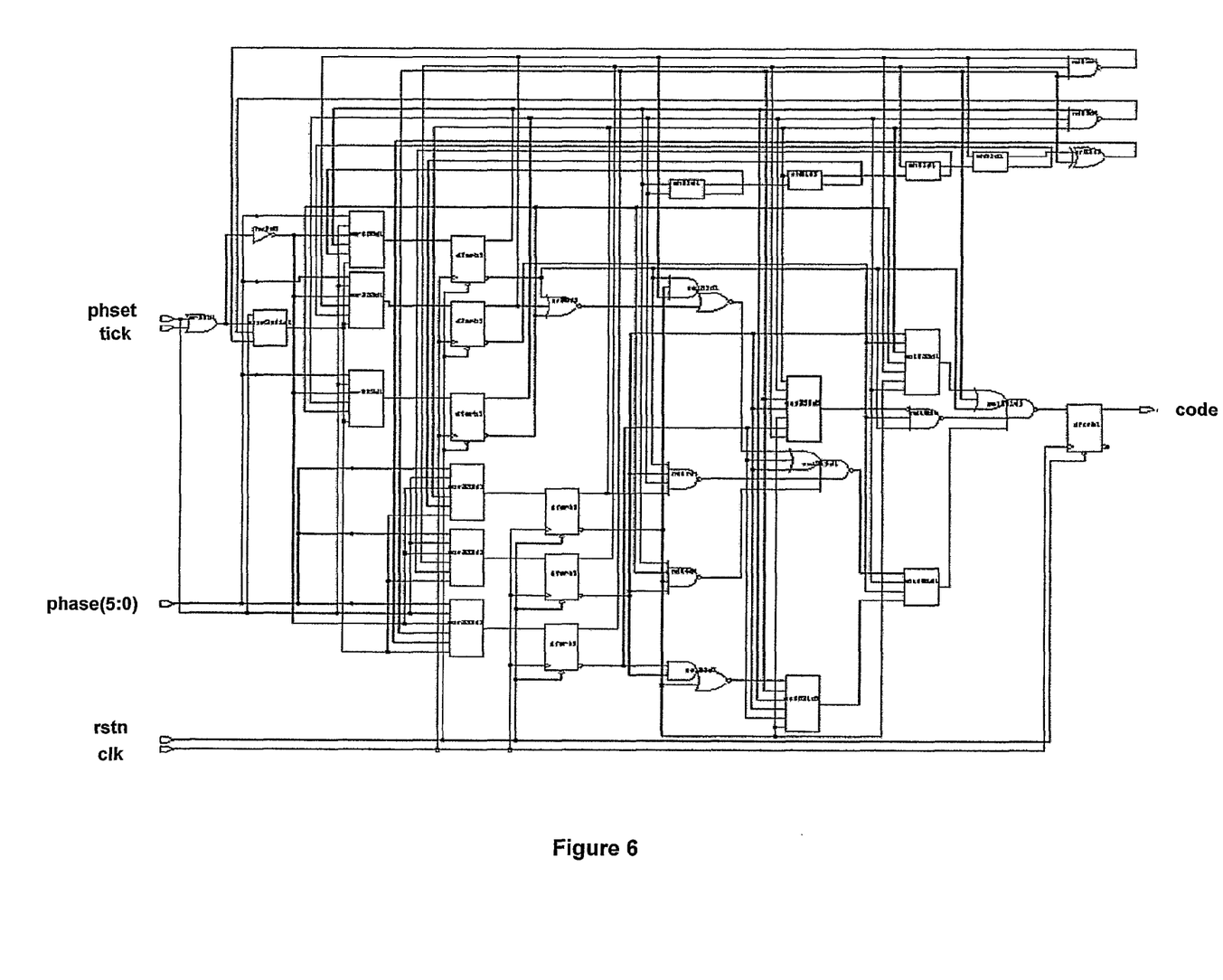
FIG. 6 is an example of a schematic diagram based on a netlist produced by the method of FIG. 5 in accordance within one embodiment of the invention.

FIG. 6 is an example of the schematic based on a netlist derived by logic synthesis from the VHDL code of Appendix 1. There are five inputs to the circuit, which from the top downwards are phset, tick, phase (5:0), rstn and clk, plus a single output, code. The circuit mainly comprises combinatorial logic in the form of gates (note that the rectangles in FIG. 6 also correspond to gate combinations). The circuit of FIG. 6 also includes seven flip-flops (these are all connected to the clk signal on their enable input and to the rstn input underneath). Of these seven flip-flops, six are used in effect to hold the six bits of the address. The remaining flip-flop is used to buffer the single chip of the code output, although in other embodiments this might be omitted. (The address flip-flops comprise a relatively high proportion of the layout of FIG. 6 because the code is short—only 64 chips; for longer codes, the address flip-flops would comprise proportionately less of the circuit). The netlist of FIG. 6 can be used as input for a determination of component placement and routing, followed by a semiconductor production operation (corresponding to operations 550 and 560 respectively in FIG. 5). The semiconductor production may be achieved by any appropriate method, such as lithography of the actual device, configuration of an FPGA, etc.

It will be appreciated that the particular schematic of FIG. 6 (including the gate combinations corresponding to the circuit rectangles) is specific to the technology of a particular manufacturer for a certain type of device, as specified by various libraries that may be linked in during the logic synthesis. (Manufacturer-specific libraries may also be used for the circuit placement and routing). Thus for FIG. 6, the manufacturer is Amtel, a company which performs contract fabrication of semiconductor devices, and the layout is adapted for an ASIC. Using technology from other manufacturers will lead to a different netlist and layout for implementing the VHDL circuit of Appendix 1. Accordingly, FIG. 6 is provided only as a broad schematic to illustrate an output from logic synthesis, and its detailed structure is not important for an understanding of the present invention.

The use of combinatorial logic to store spreading codes can lead to a significant saving in gates compared to a standard memory implementation based on flip-flops or static RAM cells or other such similar conventional memory architectures.

TABLE 1

Circuit requirements for code storage

| Code | Registers | Area in $\mu m^2$ | Equivalent NAND gates |
|---|---|---|---|
| Gal L1 4096 memory | 4096 + 12 | 79300 | 6344 |
| Gal L1 4096 combinatorial | 13 | 13745 | 1078 |
| Gal E5A 10230 memory | 10230 + 14 | 194312 | 15545 |
| Gal E5A 10230 combinatorial | 15 | 27565 | 2514 |
| GPS 1023 code LFSR | 74 | 8282 | 663 |
| GPS 1023 memory | 1023 + 10 | 21681 | 1735 |
| GPS 1023 combinatorial | 13 | 5400 | 432 |

TABLE 1-continued

The first and third rows of Table 1 correspond to the estimates for a "standard" memory (static RAM) implementation for holding a spreading code, as derived above for the Galileo L1 and E5a signals respectively. The second and fourth rows of Table 1 correspond to an implementation based on combinatorial logic using logic synthesis, such as described above in relation to FIGS. 5 and 6. It will be seen from Table 1 that the use of combinatorial logic provides a very substantial saving of 80% or more in terms of registers (flip-flops), gates and circuit area compared to a standard memory implementation.

Note that the numbers in rows two and four of Table 1 reflect the output from logic synthesis (assuming an ASIC implementation), and so should be regarded as genuine potential implementations, rather than mere estimates. It will be appreciated of course that these numbers will vary slightly for other potential implementations, for example using technology from different manufacturers, FPGAs rather than ASICs, and so on. For example, it may be possible to provide an even more compact implementation using a fully-customised VLSI implementation. Of course, such a customised VLSI implementation would be significantly more expensive than using a FPGA or ASIC, although may be commercially viable for mass market receivers.

The final three rows of Table 1 relate to a 1023 chip CA code used for GPS. The sixth and seventh rows of Table 1 represent storing this code in conventional memory and using combinatorial logic respectively. Again it can be seen that the use of combinatorial logic to store the memory codes results in a significant saving of gates and circuit area. The fifth row of Table 1 presents figures for an actual implementation of the 1023 chip spreading code using an LFSR (since the GPS codes are Gold codes). It will be noted that the implementation complexity related to the combinatorial logic is of the same order as the LFSR implementation (which requires a relatively high number of registers), and in this specific case, it is even more compact. Accordingly, the use of combinatorial logic for storing spreading codes is potentially attractive even for Gold codes and other mathematically generated codes.

It will be appreciated that using combinatorial logic for storing codes results in codes that are, in effect, hard-wired into the receiver. However, in practice the set of spreading codes for a satellite constellation is likely to be stable for many years (this has certainly been the case with GPS). In these circumstances, it is generally more important to be able to flexibly assign the spreading codes to different receive channels than to be able to change the spreading codes themselves. The former aspect can be accommodated with receivers that include combinatorial logic for storing the spreading codes, as described above in relation to FIGS. 3 and 4.

A receiver may be provided with stored codes for at least a couple of satellites that are designated as spares (in addition to the codes for the main constellation of satellites). These replacement satellites would then be brought into the navigation constellation should any of the original set of satellites fail. Assuming that the codes allocated to the replacement satellites are known in advance, they can also be stored into the receiver using combinatorial logic, and switched in as appropriate, for example as described above in relation to FIGS. 3 and 4. In other embodiments, a receiver may be provided with conventional memory, such as PROM or RAM, which could then be loaded with any new satellite spreading codes (to work in conjunction with those held in the code storage unit(s) described herein).

In some implementations, a receiver may store spreading codes for at least two satellite constellations, for example Galileo and GPS, in order to provide combined position information. Although the GPS spreading codes are Gold codes, and are normally generated within a receiver using LFSRs, the GPS codes could be stored instead as complete chip patterns using combinatorial logic if so desired (as opposed to using an LFSR, which in effect stores an algorithm for generating a chip pattern, rather than the chip pattern itself). As noted from Table 1, the use of combinatorial logic for storing complete GPS codes may in fact lead to a more compact implementation than one based on LFSRs. Accordingly, the use of combinatorial logic for holding spreading codes is compatible with specific or bespoke code patterns as well as with conventional code patterns derived from mathematical algorithms, such as those based on Gold codes. It will also be appreciated that combinatorial logic can be used for holding the primary code and/or secondary code portions of a spreading code, or for holding a complete bit sequence representing the resulting combination of the primary and second codes.

The combinatorial logic for storing a spreading code can be incorporated not only into a receiver, but also into a satellite. In this case, the combinatorial logic is used for storing the spreading code for use in the signal to be broadcast to earth. However, in general the approach described herein is more attractive for receivers than for satellites. Thus satellites only need to store their own spreading code (rather than the spreading codes for the entire constellation), so that the pressure on storage facilities is less acute for satellites than for receivers. Furthermore, each satellite would require a different code storage unit particular to its own spreading code. This raises additional complexity issues for hardware validation and manufacturing, compared to a conventional memory architecture, in which a standard set of memory cells can be used on all satellites, and then loaded with the desired spreading code as appropriate. In addition, satellites are not mass market devices, and so are not subject to the same cost constraints as receivers.

It will also be noted that although the approach described herein is primarily intended for use in satellite navigation systems, it could also be employed in other navigation or communication systems (satellite, terrestrial or maritime) that currently use LFSRs to generate synchronisation codes, filters, filter-banks and such-like. One particular example is a pseudolite, as mentioned above, which generates an analogous positioning signal to that from a navigation satellite, but is ground-based. Pseudolites are typically employed at locations where high accuracy is required, for example around airports, to augment (and emulate) positioning signals from satellites. Accordingly, the spreading codes for pseudolite signals could be stored in receivers (and/or possibly the pseudolites themselves) using combinatorial logic as described herein.

In conclusion, although a variety of embodiments have been described herein, these are provided by way of example only, and many variations and modifications on such embodiments will be apparent to the skilled person and fall within the scope of the present invention, which is defined by the appended claims and their equivalents.

APPENDIX 1

```
-- File        : ca.vhd (Galileo Memcodes)
-----------------------------------------------------------------
-- Description: Hard-coded LUT for ca code
-----------------------------------------------------------------
library ieee;
use ieee.std_logic_1164.all;
use ieee.std_logic_unsigned.all;
entity cacode is
  port (
    phase  : in std_logic_vector(5 downto 0);  -- initial code phase
    phset  : in std_logic;                     -- preset the phase
    clk    : in std_logic;                     -- clock
    rstn   : in std_logic;                     -- reset
    tick   : in std_logic;                     -- chip tick
    code   : out std_logic);                   -- code output
end cacode;
architecture rtl of cacode is
signal addr : std_logic_vector(5 downto 0);    -- code phase
constant ca: std_logic_vector(0 to 63) := (
  '0','0','1','1','0','1','1','1','1','1','0','0','0','1','1',
  '0','1','0','1','1','0','1','1','0','0','0','1','1','0',
  '1','0','1','1','1','0','1','1','0','0','0','0','0','1','0',
  '1','0','1','0','0','1','0','1','1','1','0','1','1','1','0',
  '1','0','1','0');
begin -- rtl (register transfer level)
  readcode: process (clk, rstn)
  begin -- process readcode
    if rstn = '0' then                -- asynchronous reset (active low)
      addr <= (others => '0');
      code <= '0';
    elsif clk'event and clk = '1' then  -- rising clock edge
      if phset = '1' then               -- preset the code phase
        addr <= phase;
      elsif tick = '1' then
        if addr >= 63 then              -- wrap counter
          addr <= (others => '0');
        else                            -- increment counter
          addr <= addr + 1;
        end if;
      end if;
      code <= ca(conv_integer(addr));
    end if;
  end process readcode;
end rtl;
```

The invention claimed is:

1. A receiver for use with a satellite navigation system comprising a constellation of multiple satellites in which each satellite transmits a signal incorporating a spreading code, the receiver including:
   at least one code storage unit that includes combinatorial logic for storing a memory code comprising a fixed pattern of chips, said stored memory code corresponding to a spreading code incorporated into a signal transmitted from a satellite, wherein said combinatorial logic includes address decoding functionality for retrieving a specified portion of the stored memory code, wherein the internal hardware configuration of said combinatorial logic is customized to the stored set of data and does not comprise standardized memory cells, and wherein the combinatorial logic for storing the memory code and the address functionality are integrated at the physical component level with no clear division between the two; and
   a correlator for performing a correlation between an incoming signal and the stored memory code retrieved from the at least one code storage unit.

2. The receiver of claim 1, wherein the receiver stores a different memory code for each satellite in the constellation of satellites.

3. The receiver of claim 2, wherein each memory code for a signal from a satellite is stored in a separate code storage unit.

4. The receiver of claim 2, wherein the different memory codes for the satellites are all stored in a single code storage unit.

5. The receiver of claim 2, wherein said at least one code storage unit stores memory codes for multiple satellites and is addressable to output a memory code for a particular satellite.

6. The receiver of claim 2, wherein the receiver includes multiple receive channels, and a stored memory code for a satellite may be supplied to any receive channel for correlation with the incoming signal on that receive channel.

7. The receiver of claim 1, wherein said at least one code storage unit further includes a sequencer.

8. The receiver of claim 7, wherein said sequencer is responsive to an increment signal to output the next chip in the stored memory code.

9. The receiver of claim 1, wherein each output from the at least one code storage unit comprises a subset representing multiple chips of said stored memory code.

10. The receiver of claim 1, wherein the spreading codes for the satellites comprise bespoke chip sequences.

11. The receiver of claim 1, wherein said at least one code storage unit is formed on a field programmable gate array device (FPGA).

12. The receiver of claim 1, wherein said at least one code storage unit is formed on an application specific integrated circuit (ASIC).

13. The receiver of claim 1, wherein said at least one code storage unit is formed on the same semiconductor device as said correlator.

14. The receiver of claim 1, wherein the combinatorial logic within the at least one code storage unit stores multiple memory codes, and a different input is applied to the combinatorial logic to select a different one of said multiple memory codes for output from the code storage unit.

15. A satellite for use in a satellite navigation system comprising a constellation of multiple satellites, in which each satellite transmits a signal incorporating a spreading code, the satellite including
at least one code storage unit that includes combinatorial logic for storing a memory code comprising a fixed pattern of chips, said stored memory code corresponding to a spreading code to be incorporated into a signal transmitted from the satellite, wherein said combinatorial logic includes address decoding functionality for retrieving a specified portion of the stored memory code, wherein the internal hardware configuration of said combinatorial logic is customized to the stored set of data and does not comprise standardized memory cells, and wherein the combinatorial logic for storing the memory code and the address functionality are integrated at the physical component level with no clear division between the two.

16. A method for operating a receiver for use with a satellite navigation system comprising a constellation of multiple satellites, in which each satellite transmits a signal incorporating a spreading code, the method including:
providing at least one code storage unit that includes combinatorial logic for storing a memory code comprising a fixed pattern of chips, said stored memory code corresponding to a spreading code incorporated into a signal transmitted from a satellite, wherein said combinatorial logic includes address decoding functionality for retrieving a specified portion of the stored memory code, wherein the internal hardware configuration of said combinatorial logic is customized to the stored set of data and does not comprise standardized memory cells, and wherein the combinatorial logic for storing the memory code and the address functionality are integrated at the physical component level with no clear division between the two; and
performing a correlation between an incoming signal and the stored memory code retrieved from the at least one code storage unit.

17. The method of claim 16, wherein the receiver stores a different memory code for each satellite in the constellation of satellite.

18. The method of claim 17, wherein each memory code for a signal from a satellite is stored in a separate code storage unit.

19. The method of claim 17, wherein the different memory codes for the satellites are all stored in a single code storage unit.

20. The method of claim 17, further comprising:
storing spreading codes for multiple satellites in a single code storage unit; and
addressing said single code storage unit to output a memory code for a particular satellite.

21. The method of claim 17, wherein the receiver includes multiple receive channels, and the method further comprises providing control signals to route a stored memory code for a satellite from said at least one code storage unit to any desired receive channel for correlation with the incoming signal on that receive channel.

22. The method of claim 16, wherein the at least one code storage unit further includes a sequencer, said sequencer being responsive to an increment signal to output the next chip in the stored memory code.

23. The method of claim 16, wherein each output from the at least one code storage unit comprises a subset representing multiple chips of said stored memory code.

24. The method of claim 16, wherein the spreading codes for the satellites comprise bespoke chip sequences.

25. The method of any of claim 16, wherein the combinatorial logic within the at least one code storage unit stores multiple memory codes, and a different input is applied to the combinatorial logic to select a different one of said multiple memory codes for output from the code storage unit.

26. A method of producing a receiver for use with a satellite navigation system comprising a constellation of multiple satellites, in which each satellite transmits a signal incorporating a spreading code, the method including:
determining a satellite spreading code to be stored within the receiver;
providing at least one code storage unit within the receiver, said at least one code storage unit including combinatorial logic for storing a memory code comprising a fixed pattern of chips corresponding to the satellite spreading code, wherein said combinatorial logic includes address decoding functionality for retrieving a specified portion of the stored memory code, wherein the internal hardware configuration of said combinatorial logic is customized to the stored set of data and does not comprise standardized memory cells, and wherein the combinatorial logic for storing the memory code and the address functionality are integrated at the physical component level with no clear division between the two.

27. The method of claim 26, wherein providing the at least one code storage unit includes producing a specification of the fixed pattern of chips within a hardware description language, and implementing said specification using logic synthesis.

28. The method of claim 27, wherein said specification is implemented on a field programmable array.

29. The method of claim 27, wherein said specification is implemented on an application specific integrated circuit.

30. The method of claim 26, wherein said satellite spreading code is a bespoke code.

* * * * *